United States Patent [19]

Kunze et al.

[11] Patent Number: 5,669,570

[45] Date of Patent: Sep. 23, 1997

[54] MAGNETIC TAPE CASSETTE APPARATUS FOR REVERSIBLE PLAYING OF MAGNETIC TAPE CASSETTES

[75] Inventors: Norbert Kunze, Ehringshausen; Dieter Müller, Staufenberg; Marc Gielkens, Braunfels, all of Germany

[73] Assignee: U.S. Philips Corporation, New York, N.Y.

[21] Appl. No.: 744,500

[22] Filed: Nov. 7, 1996

Related U.S. Application Data

[63] Continuation of Ser. No. 378,699, Jan. 26, 1995, abandoned.

[30] Foreign Application Priority Data

Feb. 12, 1994 [DE] Germany .................. 44 04 578.6

[51] Int. Cl.$^6$ .......................... G11B 15/32; G11B 5/008
[52] U.S. Cl. ............................ 242/356.4; 360/96.2
[58] Field of Search ...................... 242/356.3, 356.4; 360/96.2

[56] References Cited

U.S. PATENT DOCUMENTS

| | | | |
|---|---|---|---|
| 4,636,889 | 1/1987 | Deutsch et al. | 360/96.2 |
| 5,023,742 | 6/1991 | Kunze | 360/96.2 X |

FOREIGN PATENT DOCUMENTS

| | | |
|---|---|---|
| 0396985 | 11/1990 | European Pat. Off. . |
| 3312134 | 4/1984 | Germany . |
| 3544550A1 | 6/1987 | Germany . |

Primary Examiner—John Q. Nguyen
Attorney, Agent, or Firm—Brian J. Wieghaus

[57] ABSTRACT

A magnetic tape cassette apparatus for reversible playing of magnetic tape cassettes with two tape spools and spool hubs, whereby one of the tape spools is rotatable in the playback or fast winding mode at any given moment. For the fast winding function, a transmission device is adjusted by insertable pushbutton rods for fast forward or fast rewind, respectively, so that the rotary movement of a drive gear for the fast forward direction can be transmitted to the one spool hub and for the fast rewind direction to the other spool hub. A selection plate is active between the pushbutton rods and the switching device and is brought into a position corresponding to the next previous tape direction, which position determines the assignment of the pushbutton rods. The selection plate derives its position responsible for the correct control of the pushbutton rods from an adjustment member which determines the playing direction by means of a position change. The pushbutton rods each cause the tape to fast wind in the same respective absolute direction irrespective of whether the apparatus was previously in the forward or reverse play mode.

7 Claims, 3 Drawing Sheets

MAGNETIC TAPE CASSETTE APPARATUS FOR REVERSIBLE PLAYING OF MAGNETIC TAPE CASSETTES

This is a continuation of application Ser. No. 08/378,699, filed Jan. 26 1995, abandoned.

BACKGROUND OF THE INVENTION

The invention relates to a magnetic tape cassette apparatus for reversible playing of magnetic tape cassettes with two tape spools and spool hubs, whereby one of the tape spools is rotatable in the playback or fast winding mode at any given moment, while for the fast winding function a transmission device can be so adjusted by means of insertable pushbutton rods for fast forward or fast rewind, respectively, that the rotary movement of a drive gear for the fast forward direction can be transmitted to the one spool hub and for the fast rewind direction to the other spool hub.

In this magnetic tape cassette apparatus known from DE 33 12 134 C1, the direction reversal takes place by means of a bracket which carries gears and which can be pivoted and shifted so as to drive either the one or the other spool hub. The movement of the bracket is determined by a guide slot arrangement. This guide slot arrangement simultaneously controls the pivoting position of a support plate on which the head support and the pressure rollers for the capstans are arranged.

Pushbutton rods for fast forward and rewind are provided, which have an adjusting effect on the bracket. The apparatus is brought into the fast forward mode by means of the one pushbutton rod, and into the fast rewind mode by means of the other pushbutton rod. This arrangement is true only when the apparatus is in the playback direction 1. In the playback direction 2 (reverse operation), the arrangement of the pushbutton rods relative to the playing direction is the opposite for the fast forward and rewind modes.

SUMMARY OF THE INVENTION

It is an object of the invention to provide a magnetic tape cassette apparatus of the kind mentioned in the opening paragraph in which it is safeguarded that the assignment of the fast forward and rewind functions to the pushbutton rods is the same, irrespective of the playing direction set previous to the fast forward/rewind.

According to the invention, this object is achieved by means of a selection plate which is active between the pushbutton rods and the transmission device and which is brought into a position corresponding to the previously obtaining tape direction, which position determines the assignment of the pushbutton rods, the selection plate deriving its position responsible for the correct control of the pushbutton rods from an adjustment member which determines the playing direction by means of a position change.

In a further embodiment of the invention, the adjustment member is a support plate for the magnetic head of the apparatus, which support plate assumes a different pivotal position in each playing direction, the selection plate following the relevant pivotal position of the support plate.

In a further embodiment of the invention, the selection plate comprises a stud which enters guide slots of the pushbutton rods sliding flat over one another in dependence on the position of the selection plate and thus in dependence on the playing direction, and is taken along by one of the pushbutton rods in dependence on the design of the guide slots during insertion, whereas the other pushbutton rod passes the stud by.

The advantage of such an arrangement is that the desired function can be achieved with only a single additional part which requires only very little extra space.

In a further embodiment of the invention, the selection plate comprises a shoulder and a check surface, between which a pin of a bracket of the transmission device enters, whereby the shoulder forms an abutment stop for the pin of the bracket when the selection plate is locked against shifting by a pushbutton rod which remains in the pushed state, so that a projection of the other pushbutton rod upon its insertion can shift the pin, and thus the bracket, along the abutment stop, while the pushbutton rod to which the selection plate is locked carries the latter along, so that the check surface thereof shifts the pin with the bracket.

BRIEF DESCRIPTION OF THE DRAWINGS

The invention will be explained in more detail with reference to the drawing, in which.

DETAILED DESCRIPTION OF THE PREFERRED EMBODIMENTS

Figure 1:
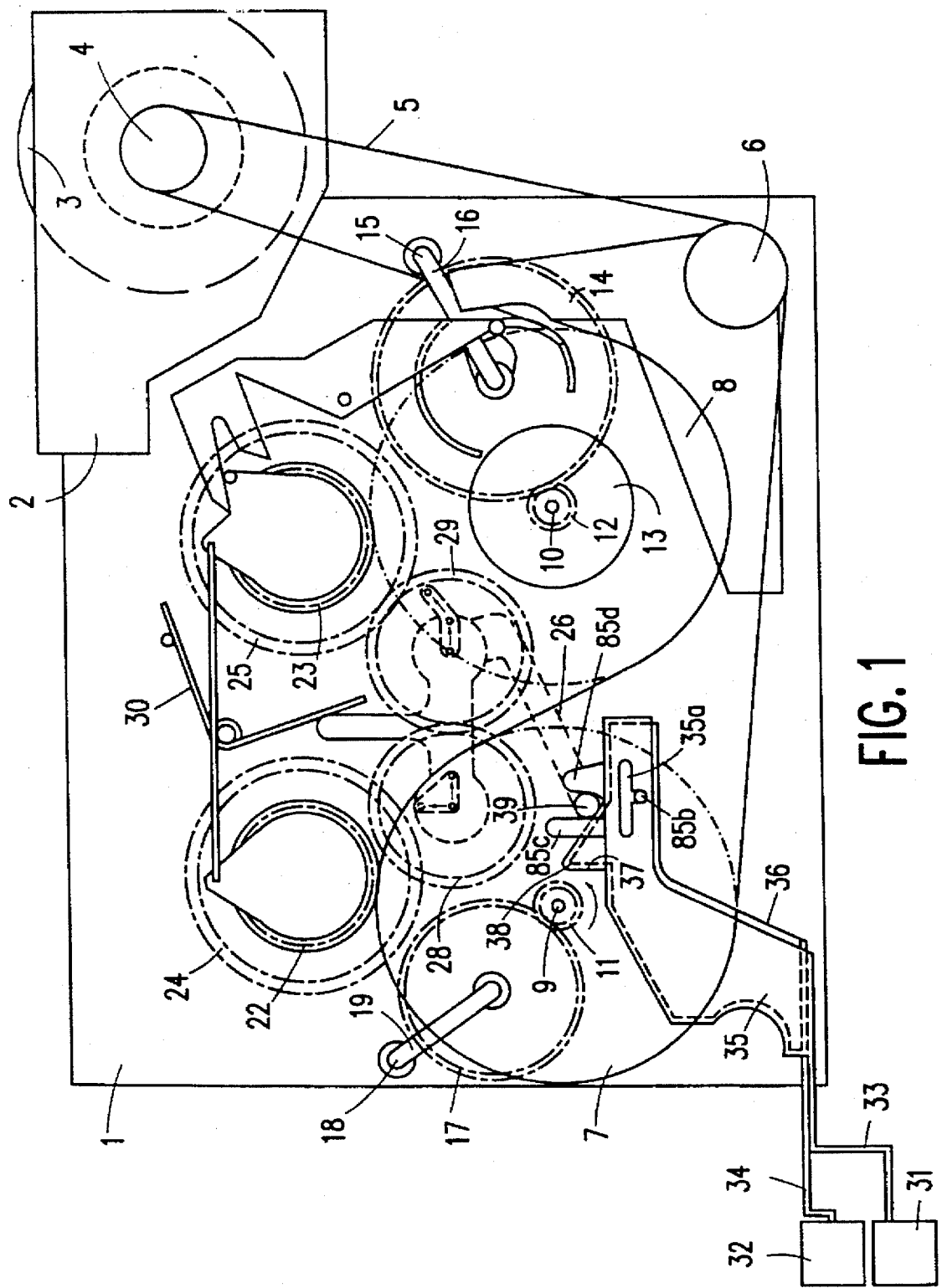
FIG. 1 is an elevation of the magnetic tape cassette apparatus built up on a base plate, seen from the drive side.

The magnetic tape cassette apparatus according to the invention as shown in FIG. 1 comprises a base plate 1 which carries a unidirectional drive motor 3 by means of a support 2. The output pinion 4 of the motor 3 drives a rope or band 5 which is so guided via a pulley 6 around flywheels 7 and 8 so that said flywheels turn in opposite directions. The flywheels 7 and 8 have their bearings in he base plate 1. The flyheel 7 is fixedly connected to a capstan 9, and the flywheel 8 is fixedly connected to a capstan 10. Furthermore, the flywheel 7 is connected to a gear 11, and the flywheel 8 to a gear 12. A further gear 13 is rotatably arranged on the flywheel 8 by means of a friction coupling, coaxially with the gear 12. A gear-type switching wheel 14 is in engagement with the gear 12 on the flywheel 8. This gear 14 can pivot about a spindle 15. The spindle 15 carries a pivot arm 16, diagrammatically shown in FIG. 1, on which the switching wheel 14 is journalled. Similarly, a gear 17 is continuosly in engagement with gear 11. This gear 17 can pivot about a pivot axis 18 by means of a pivot arm 19 which is diagrammatically depicted.

Figure 2:
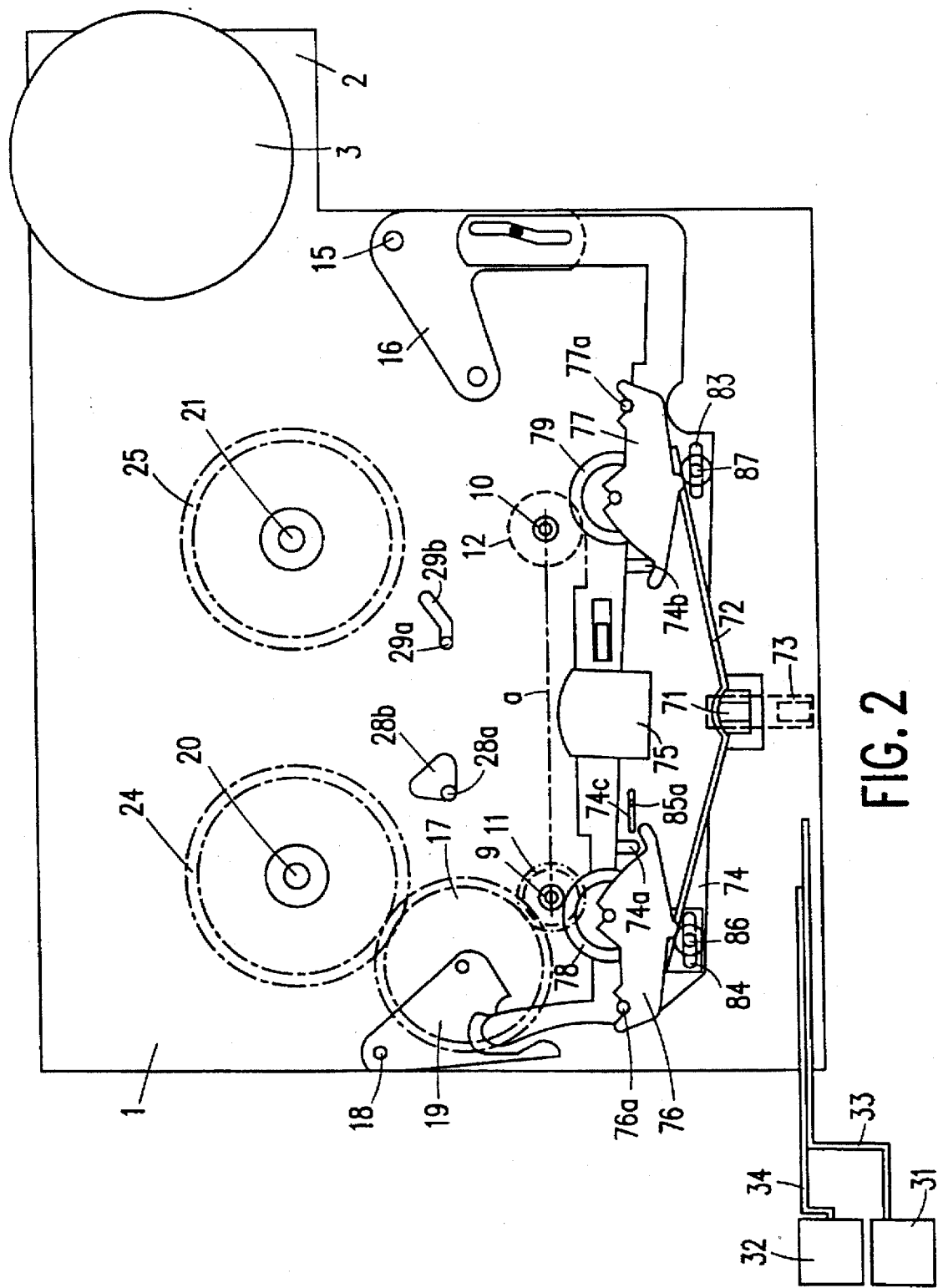
FIG. 2 shows the magnetic tape cassette apparatus from the front.

As is shown in FIG. 2, spool hubs 20 and 21 have their rotation bearings in the base plate 1. These spool hubs 20 and 21 are fixedly connected to fast winding wheels 22, 23. FIG. 1 playback wheels 24,25 are connected to the spool hubs 20, 21 via friction couplings.

A transmission device 26, which is journalled in the base plate 1 with shifting possiblity, carries two gears 28, 29 side by side. a Spring 30 presses the transmission device 26 continuously into a starting position shown in FIG. 1.

The transmission device 26 carries two pins 28 *a* and 29 *a* which can slide in a triangular hole 28*b* and in a slot 29*b*, respectively, of the base plate. The hole 28*b* and the slot 29*b* limit the movement possibility of the transmission device 26.

Two pushbuttons 31 and 32 are provided for the fast forward and rewind functions. These buttons 31, 32 are connected to slides, or slides portions 35,36 via pushbuttons rods 33, 34. The slides 35 and 36 act on an arm of the transmission device 26. The slides 35, 36 are provided with shoulders 37, 38 for this purpose. These shoulders 37 and 38 act on a pin 39 of the transmission device 26.

FIG. 1 shows, above the frame 1 which forms a base plate, inter alia the flywheel 7, 8 and gears of the drive with the pushbutton rods 33, 34 of the slides 35, 36. Another portion of the drive is provided at the other side of the base plate and depicted in FIG. 2.

A support plate 74 shown in FIG. 2 is adjustable by means of a mechanism which is not shown. The support plate 74 is the adjustment member which controls the current position of a selection plate 85. A projection 71 of this invisible mechanism serves for the adjustment. This projection cooperates with a blade spring 72, as is evident from FIG. 2, and extends through a longitudinal slot 73 in the base plate 1. The blade spring 72 presses with its free ends against carriers 76, 77 which have their bearings on the support plate 74. This support plate 74 carries the magnet head 75 in its centre and, on either side of the magnet head 75, the carriers 76, 77 which can pivot about pivot points 76a, 77a and in which pressure rollers 78, 79 are journalled. The carriers are pressed against abutments 74a, 74b of the support plate 74 when the support plate 74 is retracted.

Longitudinal slots 84, 83, in which guide pins 86, 87 can slide, are arranged in the support plate 74 parallel to the connecting line a between the capstans 9, 10.

A pivoting mechanism (not shown) is provided by which the support plate 74 is pivotable relative to the line a so as to press the pressure roller 79 against the capstan 10 for forward rotation and the pressure roller 78 against the capstan for reverse rotation during playing. The manner of operating of this pivoting mechanism is not relevant here. The only important thing is that the support plate occupies different pivotal positions relative to the line a in forward and reverse playing modes.

Figure 3:
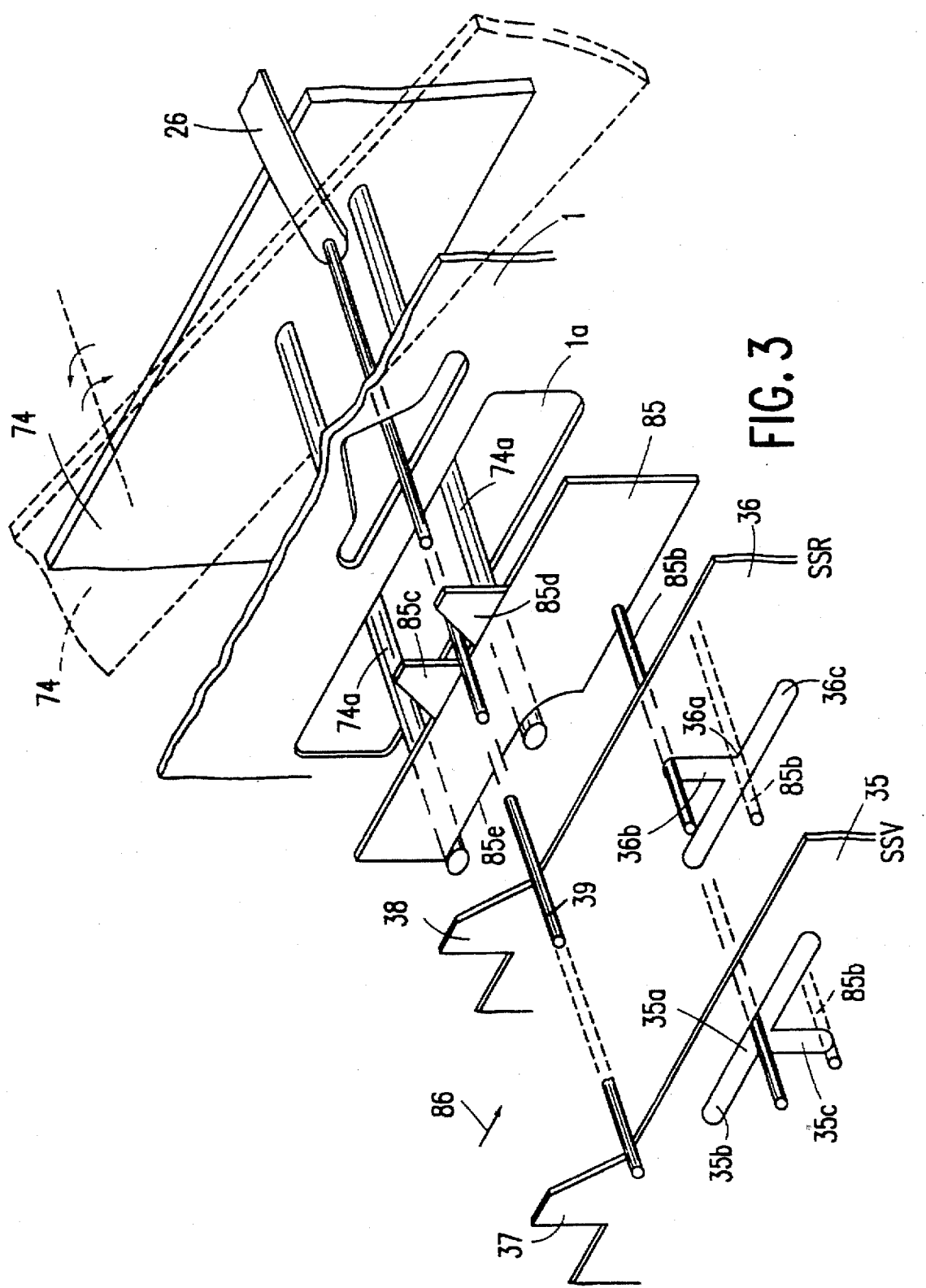
FIG. 3 is a perspective view of the cooperation of the slides of two pushbutton rods together with a pivotable support plate and a selection plate which acts on the support bracket of a fast winding device.

These pivotal positions are shown more clearly in FIG. 3. FIG. 3 is a perspective view of the cooperation of parts 35, 36 of the pushbutton rods 33, 34 widened into slides with the support plate 74 and a selection plate 85. The support plate 74 is provided with two reds 74a extending mutually parallel away therefrom and passing through an opening 1a in the base plate 1 up to operational edges 85e of the selection plate 85. A further rod 85b is provided at the selection plate 85, which rod is passed through T-shaped holes 35a and 36a of the slides 35 and 36 in a direction opposite to that of the rods 74a.

In the representation of FIG. 3, which shows the interaction between the rods 85a and 85b with the slides 35 and 36 on the one hand and the support plate 74 in forward playing direction, the rod 85b is present in the crossbar 35b of the T-shaped hole 35a, whereas it is in the leg 36b of the T-shaped hole 36a. Furthermore, the projections 37 and 38 lie in front of the rod 39 of the transmission device 26. The selection plate 85 is provided with a shoulder 85c and a check surface 85d. The rod 39 continuously engages between the shoulder 85c and check surface 85d.

It is evident from FIG. 3 that the rod 85b in the crossbar 35b of the T-shaped hole 35a can be shifted in the direction of arrow 86, whereas the rod 85b lies fixed in the leg 36b of the slide, given the position of the support plate 74 shown with full lines in forward playing direction and the accompanying position of the selection plate 85. This means that the leg 36b carries along the rod 85b, and thus the selection plate 85, when the slide 36 is pushed inwards. The transmission device 26 is thereby shifted in longitudinal direction such that the playback wheel 25 is driven by the gear 13 of the capstan 10 via gear 29. If the slide 35 is operated for fast rewinding, starting from the forward playback mode just discussed, the rod 85 of the selection plate 85 is located in the crossbar 35b of the T-shaped hole 35a so the selection plate 85 is moved in the insertion direction. This means that, when the pushbutton 35 for fast rewind is pressed, the projection 37 presses the rod 39 up between the shoulder 85c and the check surface 85d. The transmission device 26 is shifted upwards and to the left thereby, so that the fast winding wheel 22 is driven by gear 13 via gears 28 and 29. The fast rewind operation is started thereby.

In the reverse playback mode, the support plate 74 occupies the position shown in broken lines in FIG. 3. The result of this is that the rod 85b is now caught in the leg 35c while it can be shifted in the crossbar 36c in the direction of the arrow 86. When the slide 35 is now pushed in the direction of arrow 86 for fast forward during reverse playback, the slide 35 takes along the rod 85b and thus also the selection plate 85. This means that the rod 39 shifts the bracket 26 in the direction of arrow 86. A fast forward operation is started thereby in that the gear 13 drives the fast winding wheel 22 via gears 28, 29. This means that, compared with the reverse playing direction previously set, fast winding takes place in the same direction. On the other hand, when the slide 36 is pressed in the direction of the arrow 86 for fast rewind, the projection 38 pushes the rod 39 between the shoulder 85c and the check surface 85d upwards such that the gear 13 of the capstan 10 now drives the fast winding wheel 23 via gear 29. The drive thus winds in a direction opposite to the previously set reverse playing direction.

The logic fast winding device is realised thereby. When the button 32 for fast rewind is pressed, a fast rewind always takes place via the slide 36 immediately, irrespective of whether the drive is in the forward or reverse playing mode. Similarly, the apparatus always switches the drive to fast forward winding by means of the slide 35 when the fast forward button 31 is pressed, immediately, irrespective of whether the apparatus is in the forward or reverse playing mode.

We claim:

1. A magnetic tape cassette apparatus for reversible playing of a magnetic tape cassette with two tape hubs, comprising:

a) first and second rotatable spool hubs for receiving the tape hubs of the tape cassette;

b) first transmission means for selectively transporting the tape at a play speed in (i) a forward tape transport direction and (ii) an opposite, reverse tape transport direction, said first transmission means including an adjustment member moveable between first and second positions corresponding to said forward and reverse tape transport directions, respectively;

c) second transmission means selectively applicable (i) to said first spool hub for fast winding said first spool hub at a speed faster than said play speed in the forward tape transport direction and (ii) to said second spool hub for fast winding said second spool hub at a speed faster than said play speed in the reverse tape transport direction;

d) a first selection rod translatable from an inactivated position to an activated position for selecting fast winding of said first spool hub in the forward tape transport direction and a second selection rod translatable from an inactivated position to an activated position for selecting fast winding of said second spool hub in the reverse tape transport direction; and e) a selection plate coupled to said adjustment member, said selection rods and said second transmission means, said selection plate occupying (i) a first position corresponding to the first tape transport direction when said adjustment member occupies said first adjustment member position and (ii) a second position corresponding to the second tape transport direction when said adjustment member occupies said second adjustment member position, and f) means for coupling said selection rods to said selection plate, said adjustment member and said second transmission means, said means for coupling including said selection rods having respective slide portions which slide flat over each other and have respective guide slots, and said selection plate having a selection plate rod which enters said guide slots of said selection rods in dependence on the position of the selection plate and on the playing direction of said first transmission means, said guide slots being arranged to cooperate with said selection plate rod such that, irrespective of whether the next preceding tape transport direction by said first transmission means at the play speed was in the forward or reverse tape transport direction, (i) translation of said first selection rod to said activated position causes said second transmission means to fast wind said first spool hub in the forward tape transport direction and (ii) translation of said second selection rod to said activated position causes said second transmission means to fast wind said second spool hub in the reverse tape transport direction, said selection plate being taken along by one of the selection rods in dependence on the design of the guide slots during translation from the inactivated to activated position of said one selection rod by engagement of the selection plate rod with the guide slot of said one selection rod, whereas the guide slot in the slide portion of the other selection rod passes the selection plate rod by during the translation from the inactivate to activated position of said other selection rod.

2. A magnetic tape cassette apparatus as claimed in claim 1, characterized in that said apparatus includes a pivotal support plate comprising a magnetic head, said support plate comprising said adjustment member, and said first and second adjustment member positions being different pivotal positions of said support plate in each said tape transport direction at said play speed.

3. A magnetic tape cassette apparatus as claimed in claim 2, characterized in that each selection rod includes a projection, said second transmission means includes a bracket with a pin, and the selection plate comprises a shoulder and a check surface, between which the pin of the second transmission means enters, whereby the shoulder forms an abutment stop for the pin of the bracket when the selection plate is locked against shifting by a selection rod which remains in the activated position, so that the projection of the other selection rod upon translation of said other selection rod from the inactivated position to the activated position shifts the pin, and the bracket, beyond the abutment stop, while the respective selection rod to which the selection plate is locked carries the selection plate along, so that the projection thereof shifts the pin with the bracket.

4. A magnetic tape cassette apparatus as claimed in claim 1, characterized in that each selection rod includes a projection, said second transmission means includes a bracket with a pin, and the selection plate comprises a shoulder and a check surface, between which the pin of the second transmission means enters, whereby the shoulder forms an abutment stop for the pin of the bracket when the selection plate is locked against shifting by a said selection rod which remains in the activated position, so that the projection of the other selection rod upon translation of said other selection rod from the inactivated position to the activated position shifts the pin and the bracket, beyond the abutment stop, while the respective selection rod to which the selection plate is locked carries the selection plate along, so that the projection thereof shifts the pin with the bracket.

5. A magnetic tape cassette apparatus for reversible playing of a magnetic tape cassette with two tape hubs, comprising:

a) first and second rotatable spool hubs for receiving the tape hubs of the tape cassette;

b) first transmission means for selectively transporting the tape at a play speed in (i) a forward tape transport direction and (ii) an opposite, reverse tape transport direction;

c) second transmission means selectively applicable (i) to said first spool hub for fast winding said first spool hub at a speed faster than said play speed in the forward tape transport direction and (ii) to said second spool hub for fast winding said second spool hub at a speed faster than said play speed in the reverse tape transport direction;

d) a first selection rod translatable from an inactivated position to an activated position for selecting fast winding of said first spool hub in the forward tape transport direction and a second selection rod translatable from an inactivated position to an activated position for selecting fast winding of said second spool hub in the reverse tape transport direction; and e) a selection plate coupled to said first transmission means, said selection rods and said second transmission means, said selection plate occupying (i) a first position corresponding to forward tape transport by said first transmission means at the play speed and (ii) a second position corresponding to reverse tape transport at the play speed by said first transmission means, and f) means for coupling said selection plate to said selection rods, said means for coupling including said selection rods have respective slide portions which slide flat over each other and have respective guide slots, and the selection plate comprises a selection plate rod which enters said guide slots of said selection rods in dependence on the position of the selection plate and on the playing direction of said first transmission means, said guide slots being arranged such that, irrespective of whether the next preceding tape transport direction by said first transmission means at the play speed was in the forward or reverse tape transport direction, (i) translation of said first selection rod to said activated position causes said second transmission means to fast wind said first spool hub in the forward tape transport direction and (ii) translation of said second selection rod causes said second transmission means to fast wind said second spool hub in the reverse tape transport direction, said selection plate being taken along by one of the selection rods in dependence on the design of the guide slots during translation from the inactivated to activated position of one selection rod by engagement of the selection plate rod with the guide slot of said one selection rod, where the guide slot in the slide portion of the other selection rod passes the selection plate rod by during the translation from the inactivated to activated position of said other selection rod.

6. A magnetic tape cassette apparatus as claimed in claim 5, characterized in that each selection rod includes a projection, said second transmission means includes a bracket with a pin, and the selection plate comprises a shoulder and a check surface, between which the pin of the second transmission means enters, whereby the shoulder forms an abutment stop for the pin of the bracket when the selection plate is locked against shifting by a said selection rod which remains in the activated position, so that the projection of the other selection rod upon translation of said other selection rod from the inactivated position to the activated position shifts the pin, and the bracket, beyond the abutment stop, while the respective selection rod to which the selection plate is locked carries the selection plate along, so that the projection thereof shifts the pin with the bracket.

7. A magnetic tape cassette apparatus as claimed in claim 5, characterized in that each selection rod includes a projection, said second transmission means includes a bracket with a pin, and the selection plate comprises a shoulder and a check surface, between which the pin of the second transmission means enters, whereby the shoulder forms an abutment stop for the pin of the bracket when the selection plate is locked against shifting by a said selection rod which remains in the activated position, so that the projection of the other selection rod upon translation of said other selection rod from the inactivated position to the activated position shifts the pin, and the bracket, beyond the abutment stop, while the respective selection rod to which the selection plate is locked carries the selection plate along, so that the projection thereof shifts the pin with the bracket.

* * * * *